UNITED STATES PATENT OFFICE.

EDWARD RAY WEIDLEIN, OF PITTSBURGH, PENNSYLVANIA, ASSIGNOR, BY MESNE ASSIGNMENTS, TO METALS RESEARCH COMPANY, OF NEW YORK, N. Y., A CORPORATION OF MAINE.

HYDROMETALLURGY OF COPPER.

1,089,096.  Specification of Letters Patent.  Patented Mar. 3, 1914.

No Drawing.  Application filed October 27, 1913. Serial No. 797,408.

*To all whom it may concern:*

Be it known that I, EDWARD RAY WEIDLEIN, a citizen of the United States, residing at and whose post-office address is No. 355 Oakland avenue, Pittsburgh, Allegheny county, State of Pennsylvania, have invented certain new and useful Improvements in Hydrometallurgy of Copper; and I do hereby declare the following to be a full, clear, and exact description of the invention, such as will enable others skilled in the art to which it appertains to make and use the same.

The present invention relates to the recovery of copper in the wet way, from its ores, and is based generally upon the reversible reaction

$$CuSO_4 + SO_2 + 2H_2O = Cu + 2H_2SO_4.$$

More specifically, it contemplates a mode of operation which makes the utilization of this reaction of high commercial value, in that in actual practice the copper can be precipitated substantially quantitatively in the metallic form. This substantially complete precipitation is likewise accompanied with the regeneration of twice the amount of sulfuric acid necessary to dissolve out the same quantity of copper precipitated, so that the solution, while it is still hot, and after the copper has been precipitated out, may be used for re-leaching the original body of ore, or for leaching a new batch of ore, as the case may be.

In the preferred practice of the invention, the ore is leached, by percolation, or by agitation with or without the admission of air, with a 3.6% sulfuric acid solution. The free acid content of the copper sulfate solution thus obtained is lowered during the leaching operation to less than 1% of free sulfuric acid. The free acid is thereupon neutralized by adding the calculated amount of calcium carbonate or ordinary limestone, or, in fact, any alkaline substance. If the alkaline substance added is one which forms an insoluble sulfate, as is the case when calcium carbonate is employed, the precipitated insoluble sulfate is separated by filtration or otherwise removed in any known way.

The copper sulfate solution will be neutral and will contain 1.5% copper, in which condition it is supplied to the absorption tower, of any suitable or convenient type. Sulfur dioxid (for instance, sulfur dioxid contained in smelter fumes) will thereupon be pumped into the solution until the desired concentration of (1.5%) sulfur dioxid for the amount of copper in solution is obtained. The solution is then pumped to the precipitation tank or tanks which may be made of iron, lead-lined throughout, and which are adapted to withstand, with safety, a relatively high pressure. Heat is then applied to the solution, in any suitable way, until a temperature of 150° C. is attained, giving a pressure of 100 pounds per square inch. As soon as these conditions of temperature and pressure are obtained, the pressure is released, the tanks emptied upon a filter, and the hot solution is run back on the ore for re-leaching purposes. The solution is very easily filtered, and the copper remains on the filter in a finely divided form. It may ther be conveniently handled by melting and poling, or by compressing it to form anodes.

The typical example given embodies the conditions necessary for completing the reaction for the attainment of the best results. Thus, it has been found that the best results are obtained with 6% solution of $CuSO_4.5H_2O$ (containing 1.5% copper) and under a pressure of about 100 pounds per square inch, at a temperature of about 150° C. It is commercially feasible, however, to increase the strength of the solution up to 3% metallic copper and to obtain a precipitation of approximately three-fourths of the copper.

The treatment of the solution, as it comes from the leaching tank, with an amount of calcium carbonate or other alkaline substance sufficient to neutralize the free acid, together with the conditions of temperature and pressure and of concentration of the sulfur dioxid in solution relatively to the concentration of copper in solution in the sulfate liquor determine the nature of the precipitate which, under these conditions, closely approximates 100% finely divided metallic copper.

The quantity of sulfur dioxid passed into the solution is determined by the degree of concentration of the copper; that is to say, the concentration of the sulfur dioxid solution expressed in per cent. by weight should not materially exceed the concentration of the copper in solution expressed in the same terms. In this connection, it is to be carefully noted that solutions of copper sulfate stronger than 6% CuSO$_4$.5H$_2$O may be, in part, precipitated by sulfur dioxid as metallic copper when the solution is first neutralized by the calcium carbonate or other neutralizing agent employed, but, in such case, the precipitation as metallic copper will not be complete. So also, at higher temperatures and pressures than 150° C. and 100 pounds, complete precipitation of the copper in the solution may be obtained, but this precipitate will consist only partially of metallic copper and will contain, in large quantities, oxids, sulfites and sulfids of copper; although sulfuric acid will nevertheless be regenerated under these conditions in sufficient quantity for re-leaching purposes.

The process is particularly applicable to the extraction of copper from low-grade copper ores,—principally the carbonate, oxid, and basic sulfate ores. The sulfur dioxid may conveniently be obtained from smelter fumes, inasmuch as the percentage of sulfur dioxid in such fumes is normally sufficient to saturate a 6% CuSO$_4$.5H$_2$O solution. Furthermore, the process finds a special application in connection with sulfid ores, inasmuch as the conversion of the sulfids usually occurring in such ores into the oxid by roasting will yield, in most cases, even more sulfur dioxid than is required for subsequent treatment of the solution. It may therefore be said that the process is applicable to all ores or other products containing copper, as, for instance, in addition to those above noted, to roasted matte from which the copper may be efficiently brought into solution by sulfuric acid. It is proposed to leach with the solution as it comes hot from the precipitation tanks, thereby utilizing its maximum leaching efficiency, and making the process continuous in the sense that the leaching solution is utilized over and over again for re-leaching the ore, after the copper has been precipitated each time out of the solution. After a certain time, should the solution become too foul on account of the accumulated impurities therein, it can be regenerated or purified for reuse, by any of the known methods.

In order to maintain a constant volume of solution, the leaching is effected, as hereinbefore indicated, with a 3.6% sulfuric acid solution, assuming a chemical and mechanical loss in the leaching operation of about 25%. The precipitated copper is not contaminated with other metals more electropositive, such as iron, as they will not be precipitated under the same conditions. The ferric iron present in the solution will use up some of the sulfur dioxid and convert it into sulfuric acid which will be an added advantage to the process, and, at the same time, the reduced ferrous sulfate in the solution, when agitated with air, is an excellent leaching agent for copper.

It will be noted that the amount of copper precipitated, expressed in percentage by weight, corresponds, within certain limits, to the ratio of the amount of SO$_2$ employed to the amount of copper contained in the solution. For instance, if the solution contains 1.5% copper and the amount of SO$_2$ employed is 1.5%, then approximately 100% of the copper present will be precipitated as metallic copper. Or, if the same 1.5% copper solution contains 1% SO$_2$, then approximately 66% of the copper present will be precipitated as metallic copper. If the percentage of SO$_2$ exceeds 1.5%, a complete precipitation of the 1.5% copper solution will be obtained, but will consist more or less of oxids, sulfites, and the like.

It will, of course, be understood that I do not claim broadly the use of sulfur dioxid as a precipitating agent in the treatment of copper sulfate solutions, inasmuch as the general reaction, as hereinbefore indicated is well known and its utilization, for commercial purposes, has been heretofore attempted. In every such attempt, however, in so far as I am aware, the precipitation of the copper in the metallic state substantially quantitatively has not even been approximated, and even its precipitation in the form of a mixture consisting largely of oxids and sulfites accompanied sometimes with a relatively small proportion of metallic copper has been incomplete. By the practice of the present invention, on the contrary, practically complete precipitation of all the copper in the solution may be obtained in the metallic form, by observing the conditions of temperature and pressure and of concentration of the sulfur dioxid solution relatively to the concentration of the copper in solution in the sulfate liquor, as hereinbefore specified; and, even with higher concentrations of copper in solution, and at higher temperatures and pressures, the preliminary neutralization of the free acid permits the complete precipitation of the copper partly in the metallic state. So also, with the employment of the preferred conditions of temperature and pressure hereinbefore specified, even though the concentration of the copper in solution may exceed the optimum, a much larger proportion of copper in the metallic form will be precipitated than is obtainable, in so far as I am aware, in the commercial practice of any other process than the one herein described based upon the employment of sulfur dioxid in the reversible reaction quoted.

By the term "substantially quantitatively" as used in the specification and claims is to be understood such a precipitation as will result in a residual leach liquor, which, when used as a final wash-water, will leave associated with the spent ore an amount of copper so small that it shall not represent a material loss, i. e. a loss whose maximum may be said to be one-fourth of the amount of copper originally present in the ore.

Having thus described my invention, what I claim is:

1. The method of extracting copper from ores, roasted matte, and other copper-bearing material, which comprises leaching the material to obtain a copper sulfate solution containing not more than 3% of copper, neutralizing the free sulfuric acid contained in the solution, and precipitating the copper substantially quantitatively by means of sulfur dioxid; substantially as described.

2. The method of extracting copper from ores, roasted matte, and other copper-bearing material, which comprises leaching the material to obtain a copper sulfate solution containing not more than one per cent. of free sulfuric acid and containing not more than 3% of copper, neutralizing the free sulfuric acid contained in the solution, and precipitating the copper substantially quantitatively by means of sulfur dioxid; substantially as described.

3. The method of extracting copper from ores, roasted matte, and other copper-bearing material, which comprises leaching the material to obtain a copper sulfate solution, neutralizing the free sulfuric acid contained in the solution, and precipitating by means of sulfur dioxid of a concentration approximately equal to the concentration of the copper in solution expressed in percentage by weight; substantially as described.

4. The method of extracting copper from ores, roasted matte, and other copper-bearing material, which comprises leaching the material to obtain a copper sulfate solution, neutralizing the free sulfuric acid contained in the solution, precipitating by means of sulfur dioxid of such concentration and under such conditions of super-atmospheric pressure and temperature as to produce a residual leach liquor of relatively low percentage in copper as compared with its original copper content, utilizing said leach liquor to extract a further portion of copper from the ore or other material treated, precipitating, as before, the additional copper thus extracted and producing a second residual leach liquor, and so on, until the ore or other material is exhausted practically completely, and finally washing out the last extracting liquor with a further quantity of the leach liquor produced in the operation; substantially as described.

5. The method of extracting copper from ores, roasted matte, and other copper-bearing material, which comprises leaching the material and obtaining a copper sulfate solution of a strength not substantially exceeding 1.5% metallic copper (6% $CuSO_4.5H_2O$), neutralizing the free sulfuric acid contained in the solution, and precipitating by means of sulfur dioxid; substantially as described.

6. The method of extracting copper from ores, roasted matte, and other copper-bearing material, which comprises leaching the material and obtaining a copper sulfate solution of a strength not substantially exceeding 1.5% metallic copper (6% $CuSO_4.5H_2O$), neutralizing the free sulfuric acid contained in the solution, and precipitating by means of sulfur dioxid, the concentration of the sulfur dioxid not exceeding substantially the concentration of the copper in solution expressed in percentage by weight; substantially as described.

7. The method of extracting copper from ores, roasted matte, and other copper-bearing material, which comprises leaching the material and obtaining a copper sulfate solution of a strength not substantially exceeding 1.5% metallic copper (6% $CuSO_4.5H_2O$), neutralizing the free sulfuric acid contained in the solution, and precipitating by means of sulfur dioxid at a temperature of substantially 150° C. and at a pressure of substantially 100 pounds to the square inch; substantially as described.

8. The method of extracting copper from ores, roasted matte, and other copper-bearing material, which comprises leaching the material and obtaining a copper sulfate solution of a strength not substantially exceeding 1.5% metallic copper (6% $CuSO_4.5H_2O$), neutralizing the free sulfuric acid contained in the solution, and precipitating by means of sulfur dioxid at a temperature of substantially 150° C. and at a pressure of substantially 100 pounds to the square inch, the concentration of the sulfur dioxid solution not exceeding substantially the concentration of the copper in solution expressed in percentage by weight; substantially as described.

9. The method of extracting copper from ores, roasted matte, and other copper-bearing material, which comprises leaching the material and obtaining a copper sulfate solution of a strength not substantially exceeding 1.5% metallic copper (6% $CuSO_4.5H_2O$), neutralizing with lime the free sulfuric acid contained in the solution, and precipitating by means of sulfur dioxid at a temperature of substantially 150° C., and at a pressure of substantially 100 pounds to the square inch, the concentration of the sulfur dioxid solution not exceeding substantially the concentration of the copper in solution expressed in percentage by weight, substantially as described.

10. The method of extracting copper from ores, roasted matte, and other copper-bearing material which comprises leaching the material to obtain a copper sulfate solution, neutralizing the free sulfuric acid contained in the solution, and precipitating by means of sulfur dioxid at a temperature of substantially 150° C. and at a pressure of substantially 100 pounds to the square inch; substantially as described.

11. The method of extracting copper from ores, roasted matte, and other copper-bearing material, which comprises leaching the material to obtain a copper sulfate solution containing not more than 3% of copper, neutralizing the free sulfuric acid contained in the solution, and precipitating by means of sulfur dioxid at a temperature of substantially 150° C. and at a pressure of substantially 100 lbs. to the square inch; substantially as described.

12. The method of extracting copper from ores, roasted matte, and other copper-bearing material, which comprises leaching the material to obtain a copper sulfate solution containing not more than one per cent. of free sulfuric acid, neutralizing the free sulfuric acid contained in the solution, and precipitating by means of sulfur dioxid at a temperature of substantially 150° C. and at a pressure of substantially 100 pounds to the square inch; substantially as described.

13. The method of extracting copper from ore, roasted matte, and other copper-bearing material, which comprises leaching the material and obtaining a copper sulfate solution containing not more than one per cent. of free sulfuric acid, neutralizing the free sulfuric acid contained in the solution and precipitating by means of sulfur dioxid at a temperature of substantially 150° C. and at a pressure of substantially 100 pounds to the square inch, the concentration of the sulfur dioxid not exceeding substantially the concentration of the copper in solution expressed in percentage by weight; substantially as described.

In testimony whereof I affix my signature, in presence of two witnesses.

EDWARD RAY WEIDLEIN.

Witnesses:
  M. A. BILL,
  C. B. SCHROEDER.